(12) United States Patent
Pan et al.

(10) Patent No.: US 9,941,640 B2
(45) Date of Patent: Apr. 10, 2018

(54) CONNECTOR HOUSING AND CONNECTOR (71) Applicants: Tyco Electronics (Shanghai) Co. Ltd., Shanghai (CN); Tyco Electronics Corporation, Berwyn, PA (US)

(72) Inventors: Youwei Pan, Shanghai (CN); Hongqiang Han, Shanghai (CN); Wenyu Liu, Shanghai (CN); Jianzhong Pan, Shanghai (CN); Steven David Dunwoody, Berwyn, PA (US); Richard James Long, Berwyn, PA (US); Matthew Ryan Schmitt, Berwyn, PA (US); Alex Michael Sharf, Berwyn, PA (US); Kevin Edward Weidner, Berwyn, PA (US)

(73) Assignees: TE Connectivity Corporation, Berwyn, PA (US); Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/966,620

(22) Filed: Dec. 11, 2015

(65) Prior Publication Data
US 2016/0170162 A1 Jun. 16, 2016

(30) Foreign Application Priority Data

Dec. 12, 2014 (CN) ............... 2014 2 0787989 U (51) Int. Cl.
*G02B 6/36* (2006.01)
*H01R 13/6581* (2011.01)
*G02B 6/42* (2006.01)
*H01R 13/58* (2006.01)
*H01R 13/6593* (2011.01)

(52) U.S. Cl.
CPC ....... *H01R 13/6581* (2013.01); *G02B 6/4261* (2013.01); *H01R 13/5825* (2013.01); *H01R 13/6593* (2013.01)

(58) Field of Classification Search
CPC .. G02B 6/4262; G02B 6/4248; G02B 6/4251; G02B 6/428; G02B 6/4261
See application file for complete search history.

(56) References Cited

U.S. PATENT DOCUMENTS

| 5,011,246 A | * | 4/1991 | Corradetti | G02B 6/4219 257/E25.032 |
|---|---|---|---|---|
| 6,618,542 B2 | * | 9/2003 | Wu | G02B 6/4477 385/135 |
| 6,755,578 B1 | * | 6/2004 | Mynatt | H05K 9/0016 385/147 |

(Continued)

*Primary Examiner* — Rhonda Peace
(74) *Attorney, Agent, or Firm* — Barley Snyder (57) ABSTRACT

A connector is provided and includes a housing with an electronic module receiving passageway positioned therein. The housing includes a first housing and a second housing. The first housing includes a pair of first sidewalls positioned opposite from each other and a pair of partitions forming a slot extending along each of the pair of first sidewalls. The second housing includes a pair of second sidewalls positioned opposite one another, an extension disposed on each the pair of second sidewalls and corresponding with the slot, and a plurality of ribs extending outward from the extension and corresponding with inner surface of the pair of partitions.

17 Claims, 14 Drawing Sheets

(56) References Cited

U.S. PATENT DOCUMENTS

| | | | | |
|---|---|---|---|---|
| 6,880,986 B2* | 4/2005 | Mynatt | H05K 9/0016 | 174/17.05 |
| 7,507,120 B1* | 3/2009 | Bright | H01R 9/032 | 439/607.41 |
| 7,857,636 B2* | 12/2010 | Su | H01R 13/502 | 439/76.1 |
| 7,883,341 B2* | 2/2011 | Lang | H01R 13/6593 | 439/465 |
| 7,922,536 B2* | 4/2011 | Zhang | H01R 13/6658 | 439/607.45 |
| 9,039,300 B2* | 5/2015 | Kondo | G02B 6/426 | 385/92 |
| 9,209,572 B1* | 12/2015 | Dunwoody | H01R 13/6581 | |
| 9,461,404 B2* | 10/2016 | Yu | G02B 6/4284 | |
| 2003/0091269 A1* | 5/2003 | Wu | G02B 6/3582 | 385/18 |
| 2004/0184745 A1* | 9/2004 | Mynatt | H05K 9/0016 | 385/94 |
| 2010/0130063 A1* | 5/2010 | Lang | H01R 13/6593 | 439/607.17 |
| 2015/0093078 A1* | 4/2015 | Yu | G02B 6/4284 | 385/77 |
| 2016/0028188 A1* | 1/2016 | Dunwoody | H01R 13/6581 | 439/607.55 |
| 2016/0170162 A1* | 6/2016 | Pan | G02B 6/4261 | 385/92 |

\* cited by examiner

CONNECTOR HOUSING AND CONNECTOR

CROSS-REFERENCE TO RELATED APPLICATIONS

This application is a continuation of Chinese Patent Application No. 201420787989.0, filed Dec. 12, 2014, claiming priority under 35 U.S.C. § 119.

FIELD OF THE INVENTION

The present invention relates to a connector and, more particularly, to a connector having a connector housing covering an electronic module and receiving a plug for the electronic module.

BACKGROUND

With the development of the electronics and communication technology, electronic data transmission speed becomes quicker and quicker. As a result, there is greater demand for electrical connector to perform at higher high data transmission speeds. For example, in order to achieve these demands, connectors capable of high electronic data transmission speed, such as a SFP (Small Form-factor Pluggable) connector, are often used to transmit electronic data between a communication apparatus and network equipment. There is a demand that the housing of these connectors possess high electromagnetic shielding performance, so as to prevent an electronic module mounted in the housing from being interfered by an external electromagnetic signal.

SUMMARY OF THE INVENTION

The present invention has been made to overcome or alleviate at least one aspect of the above mentioned disadvantages.

A connector is provided and includes a housing with an electronic module receiving passageway positioned therein. The housing includes a first housing and a second housing. The first housing includes a pair of first sidewalls positioned opposite from each other and a pair of partitions forming a slot extending along each of the pair of first sidewalls. The second housing includes a pair of second sidewalls positioned opposite one another, an extension disposed on each the pair of second sidewalls and corresponding with the slot, and a plurality of ribs extending outward from the extension and corresponding with inner surface of the pair of partitions.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
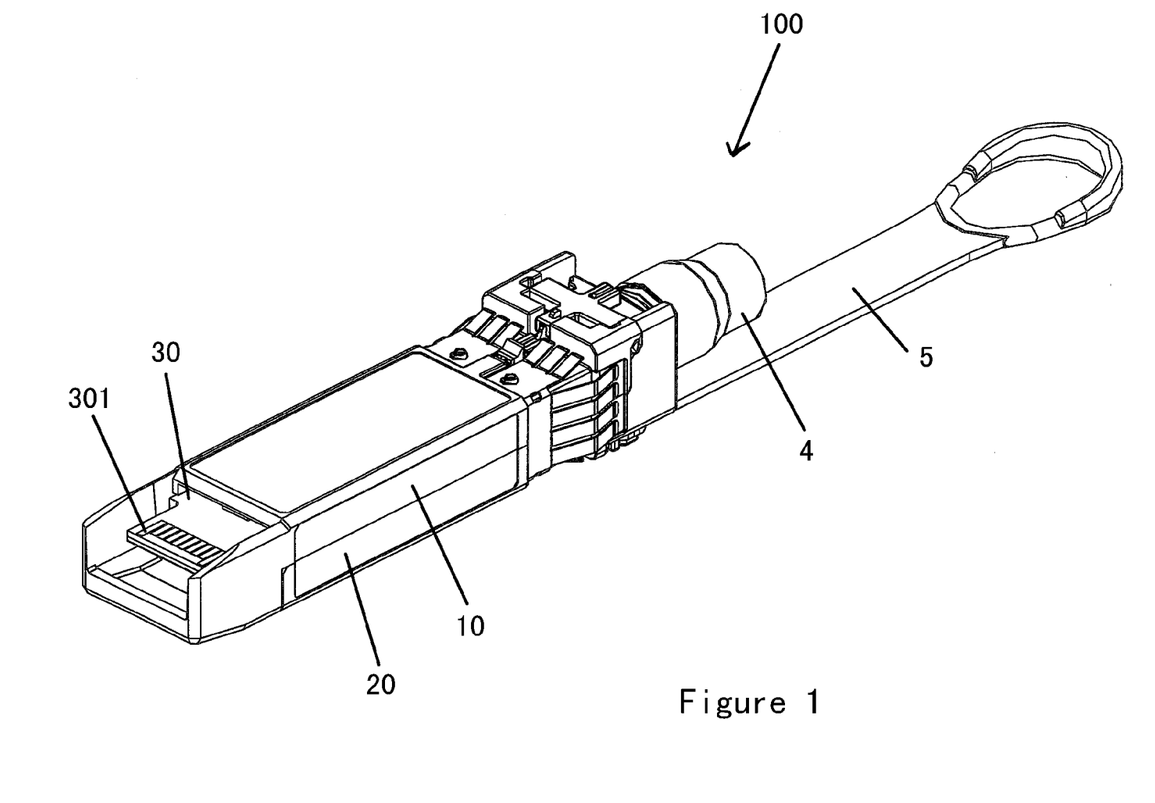
FIG. 1 is a perspective view of a connector according to the invention.
Figure 2:
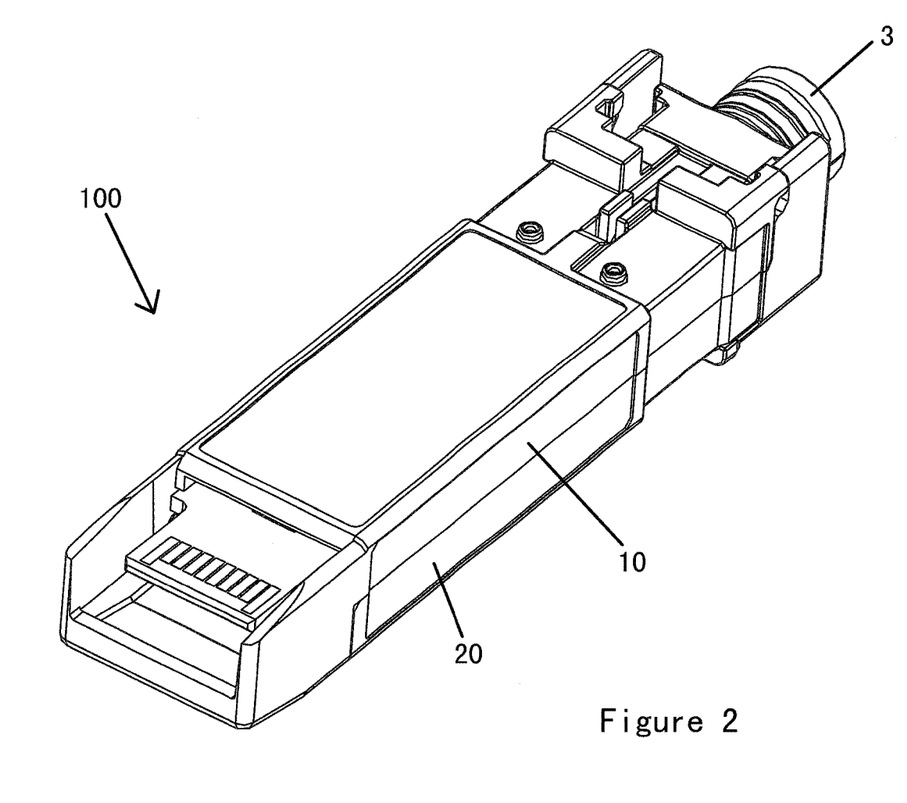
FIG. 2 is a close-up view of the connector of FIG. 1, showing a sleeve and an grip removed.
Figure 3:
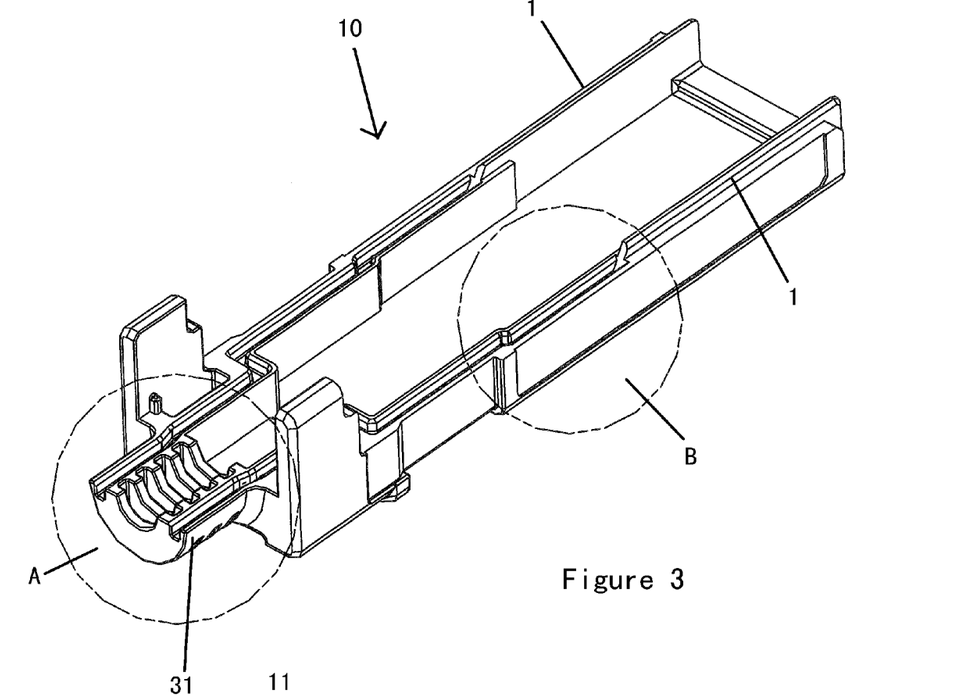
FIG. 3 is a perspective view of a first housing of the connector of FIG. 1.
Figure 4:
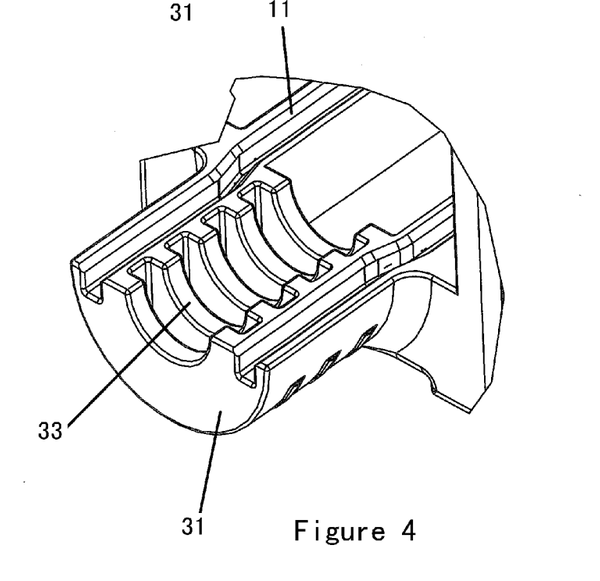
FIG. 4 is an enlarged view of a section A shown in FIG. 3.
Figure 5:
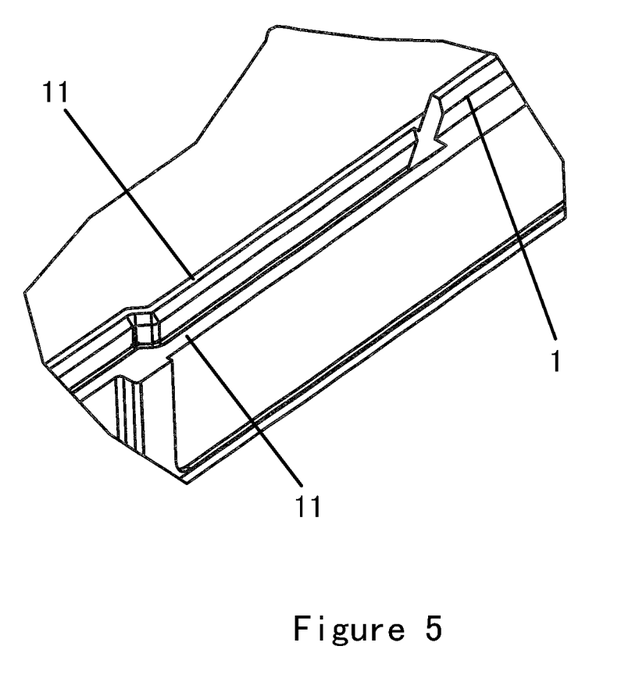
FIG. 5 is an enlarged view of a section B shown in FIG. 3.

According to a general concept of the invention, a connector 100 is provided, for example, a SFP (small form-factor pluggable) connector, as shown in FIGS. 1-2. A cable (not shown) is generally connected to an electronic apparatus using the connector 100 so as to transmit data signals between a communication apparatus and network equipment.

According to the invention, the connector 100 generally includes a housing and an electronic module 30 mounted in the housing. The housing receives conductors of the cable that are electrically connected to one end of a contact 301 of the electronic module 30, and the other end of the contact 301 is electrically connected to a respective terminal of the electronic apparatus.

As shown in FIGS. 2-10, in an exemplary embodiment of the invention, the housing includes a first housing 10 and a second housing 20. The first housing 10 includes a pair of first sidewalls 1 positioned opposite one another and a slot (see FIG. 5) formed along a part of each of the pair of first sidewalls 1. The slot includes partitions 11 formed in at least a part of each of the first sidewalls 1 and positioned opposite each other. The partitions 11 correspond to the electronic module 30. The second housing 20 includes a pair of second sidewalls 2 and an extension 21 (see FIG. 8) extending along a longitudinal axis of the connector housing. The extension 21 is provided along a part of each of the second sidewalls 2 and corresponds to the electronic module 30. One or more ribs 22 are formed on the extension 21 and extend outward therefrom.

Figure 9:
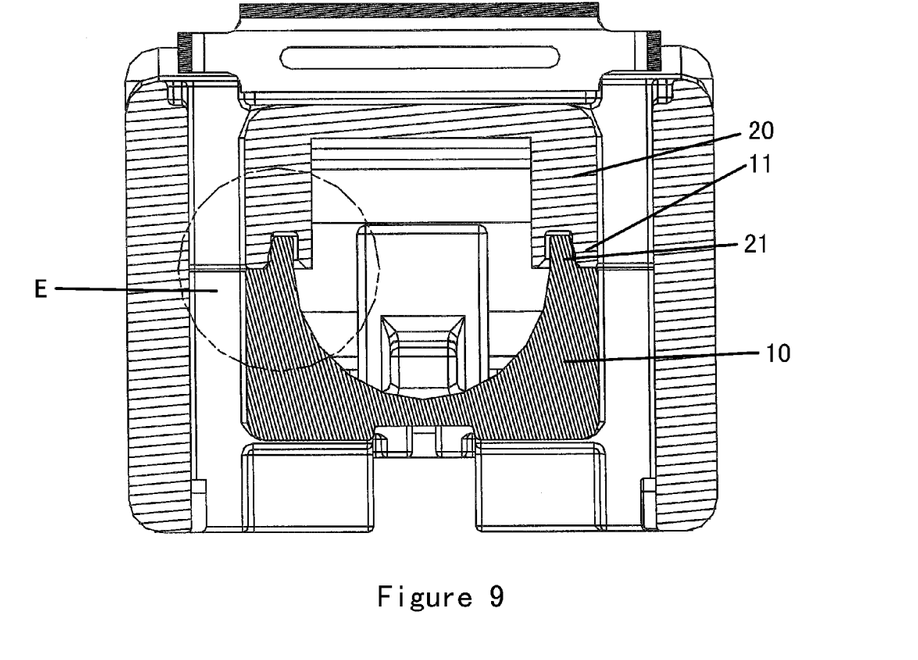
FIG. 9 is an enlarged lateral cross section view of the connector of FIG. 3.
Figure 10:
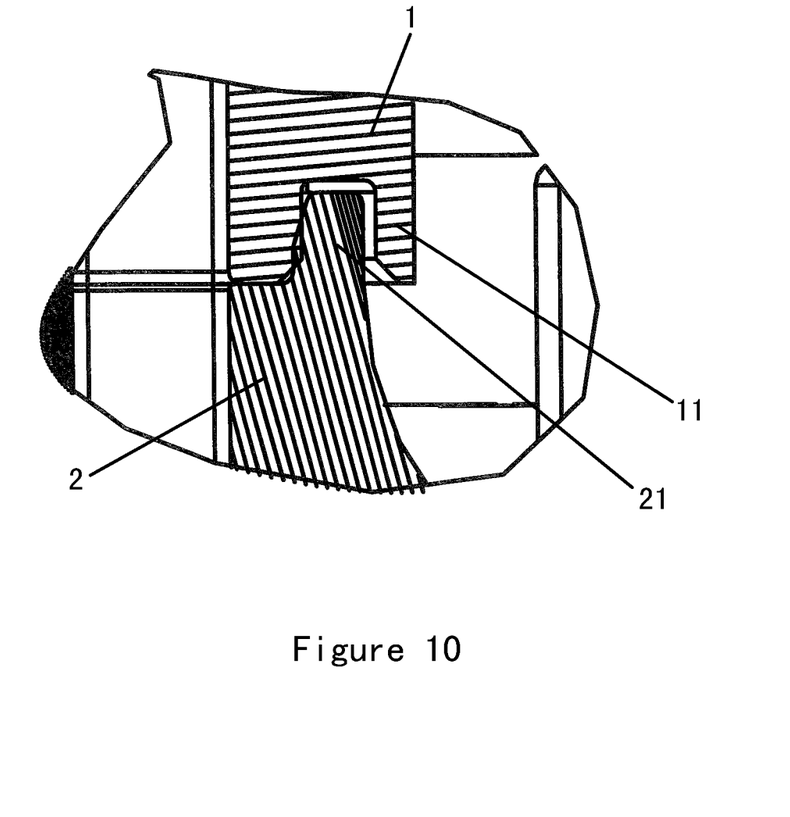
FIG. 10 is an enlarged view of a section E shown in FIG. 9.

After assembling the first housing 10 and the second housing 20 together, the first housing 10 and the second housing 20 receive the electronic module 30 and are then coupled together, and, as shown in FIGS. 9 and 10, the extension 21 is fitted in the respective slot and clamped between the partitions 11 of the respective slot. The two partitions 11 (see FIG. 5) are provided on at least a part of each of the first lateral walls which corresponds to the electronic module 30. As a result, there is no path directly into or out of the connector housing along a radial direction of the electronic module 30 and, therefore, preventing an external electromagnetic signal from entering into the connector housing and disadvantageously interfering with the performance of the electronic module inside the connector housing, or preventing an electromagnetic signal generated by the electronic module inside the connector housing from leaking outside the connector housing and disadvantageously interfering the performance of the other electronic modules outside the connector housing. Thereby, the invention effectively improves the electromagnetic shielding protection to the electronic module mounted in the connector housing.

In an exemplary embodiment, the slot, formed by the partitions 11 of the first sidewall 1, is substantially U-shaped and is adapted to mate with the extension 21 of the second sidewall 2, thereby increasing the contact area, improving the contact reliability, and reducing the gap between the housing and the cable and avoiding the signal leakage.

Figure 6:
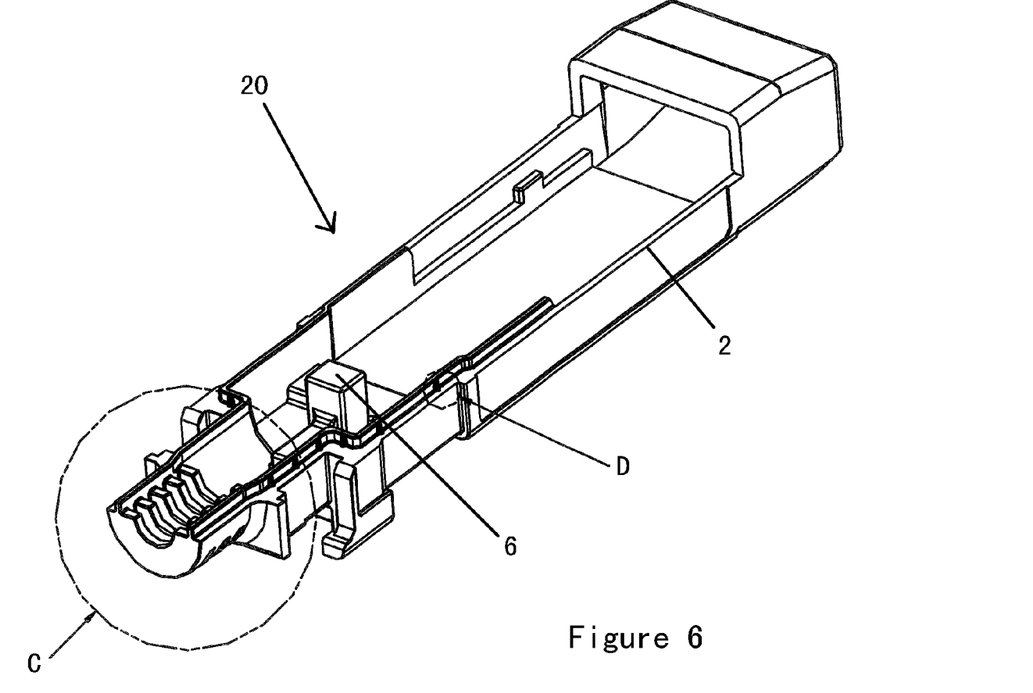
FIG. 6 is a perspective view of a second housing of the connector of FIG. 1.
Figure 7:
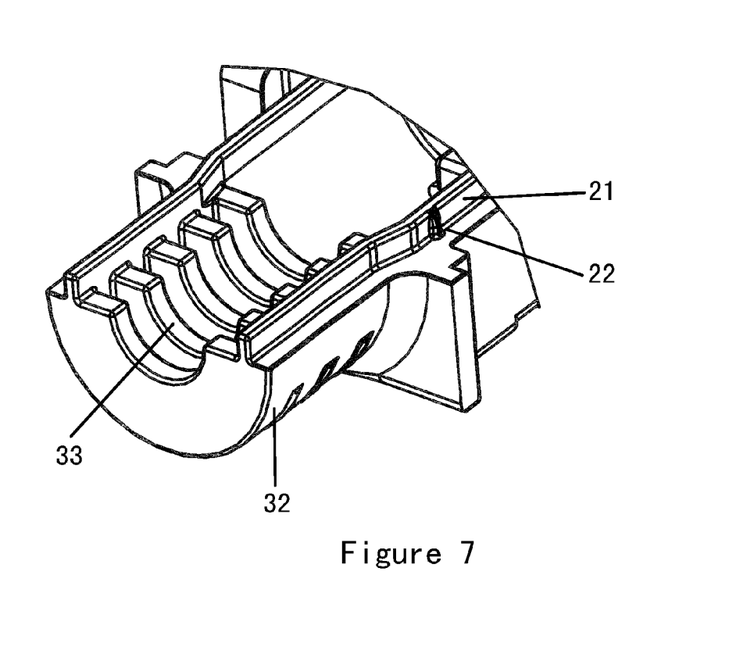
FIG. 7 is an enlarged view of a section C shown in FIG. 6.
Figure 8:
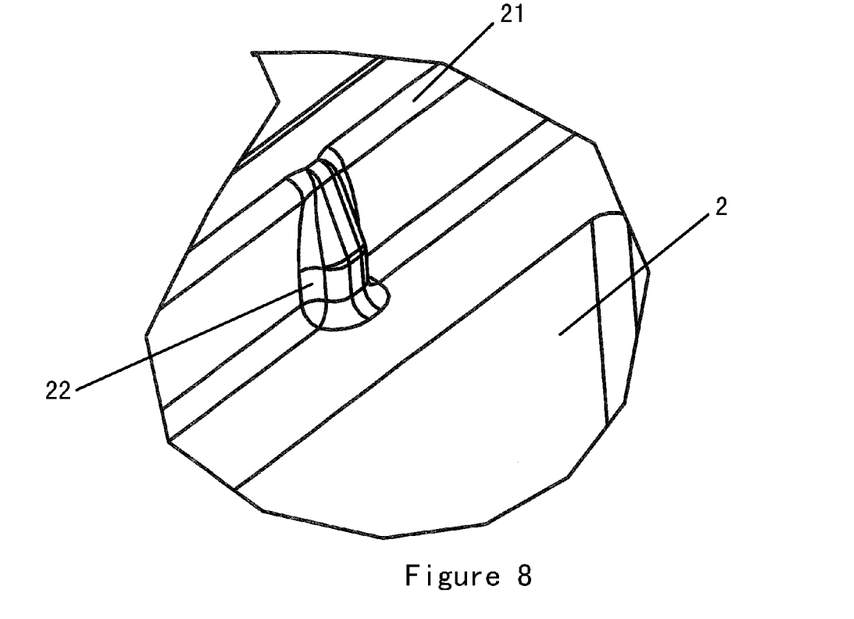
FIG. 8 is an enlarged view of a section D shown in FIG. 6.

In an exemplary embodiment, as shown in FIGS. 6 and 8, the plurality of ribs 22 are disposed on an outer side of each of the extensions 21, so as to increase a force to clamp the extension 21 with the partitions 11 of the slot. In an exemplary embodiment, when the first housing 10 and the second housing 20 are engaged together, the extension 21 is clamped between the partitions 11 of the respective slot, and the ribs 22 on the extension 21 also are clamped between the partitions 11 of the respective slot. Generally, the total thickness of the extension 21 and the rib 22 is designed to be slightly larger than the gap distance between the partitions 11, so that the ribs 22 are fitted in the slot in a way of interference fit. Thereby, the extension 21 can be reliably held in the slot. Furthermore, at least one of the ribs 22 of the extension 21 and the partitions 11 is formed with a slope thereon, so as to guide the ribs 22 to enter into the slot.

In an alternative embodiment, one skilled in the art should appreciate that the ribs may be formed on an inner side of the extension 21. In another alternative embodiment, the ribs may be formed along an inner section of the partitions 11 of each slot.

The plurality of ribs 22 are constructed to be mated with the partitions 11 of the slot in a way of interference fit along a plurality of points, in order to ensure that the first and second housings 10, 20 may reliably engage each other. In another alternative embodiment, the ribs 22 could be separate pillars which are adjacent to an inner side of the extension 21, and are constructed to be mated with the partitions 11 of the slot through interference fit along a plurality of points in order to ensure that the first and second housings reliably engage one another.

As shown in FIGS. 3-4 and 6-7, the connector housing further includes a pair of cable receiving section 31, 32 integrally formed along proximal ends of the first and second housings 10, 20, respectively. The pair of cable receiving section 31, 32 is configured to combine a cable receiving passageway 3 to receive a cable into the connector housing. That is, when the first housing 10 and the second housing 20 are engaged together, the cable receiving section 31 formed on the first end of the first housing 10 and the cable receiving section 32 formed on the first end of the second housing 20 form the cable receiving passageway 3 having a through hole extend there through and into the interior of the connector housing, so that a cable may pass through the cable receiving passageway 3 and connect the electronic module 30 positioned in the connector housing.

In an exemplary embodiment, a plurality of ring protrusions 33 are formed on an inside wall of each of the cable receiving section 31, 32. The ring protrusions 33 may be independent from each other or have a form of helical shape. Accordingly, the ring protrusions 33 may press against a cable positioned in the cable receiving passageway 3 and, thereby, improve the sealing performance, and preventing the electromagnetic signal from passing through the cable receiving passageway 3 and entering into the interior of the housing or being leaked outside the housing in an axial direction of the cable receiving passageway 3. As shown in FIG. 1, a sleeve 4 is provided on the cable receiving section 31, 32 to engage the cable receiving section 31, 32 together. Thereby, the first housing 10 and the second housing 20 may be held together by the sleeve 4. The sleeve 4 may be made of metal, such as, stainless steel, copper, etc., and tightly clamped on the cable receiving passageway 3. In another embodiment, the sleeve 4 may be made of elastic material, for example, rubber, and elastically and tightly fastened on the cable receiving passageway 3. With the above configuration, the first housing 10 and the second housing 20 may be held together, and the cable may be reliably held in the cable receiving passageway 3 by the ring protrusions 33.

In an exemplary embodiment, the slot extends to the cable receiving section 31, and the extension 21 extends to the cable receiving section 32, so that the entire extension 21 is clamped between the partitions 11 of the respective slot after assembling the first housing 10 and the second housing 20 together. In this way, the cable receiving section 31, 32 also may be engaged by engaging the slot and the extension 21, further preventing the electromagnetic signal from passing through the cable receiving passageway 3 and entering into the interior of the housing or being leaked outside the housing in a radial direction of the cable receiving passageway 3.

As shown in FIG. 1, a grip 5 is provided on the second housing 20. The grip 5 extends beyond the first end of the second housing 20 in the axial direction. Thereby, if the operation space for the connector is limited, the connector 100 can be simply inserted into or removed from a slot of an electronic apparatus (not shown) by handling the grip 5. In an alternative embodiment, the grip 5 may be mounted on the first housing 10.

In an exemplary embodiment, the connector housing may have a substantial cuboid shape, that is, the first housing 10 and the second housing 20 both have a substantial cuboid shape. In order to prevent the electronic module 30 from being moved in the housing during inserting the connector 100, a block 6 is provided on the inner side of the second housing 20, and the electronic module 30 is mounted in the downstream of the block 6 in a direction of inserting the connector 100.

Hereafter, it will describe the operation of assembling the connector according to embodiments of the invention. Firstly, an electronic module to be connected to the cable is positioned in the first or second housing 10, 20. Next, the first and second housings 10, 20 engage one another and the extension 21 is press fit by the partitions 11, a mounting the sleeve 4 is positioned over the cable receiving passageway 3 to hold the first and second housings 10, 20 together.

Now with respect to FIGS. 11-20, another connector 200 according to the invention will be described.

Figure 11:
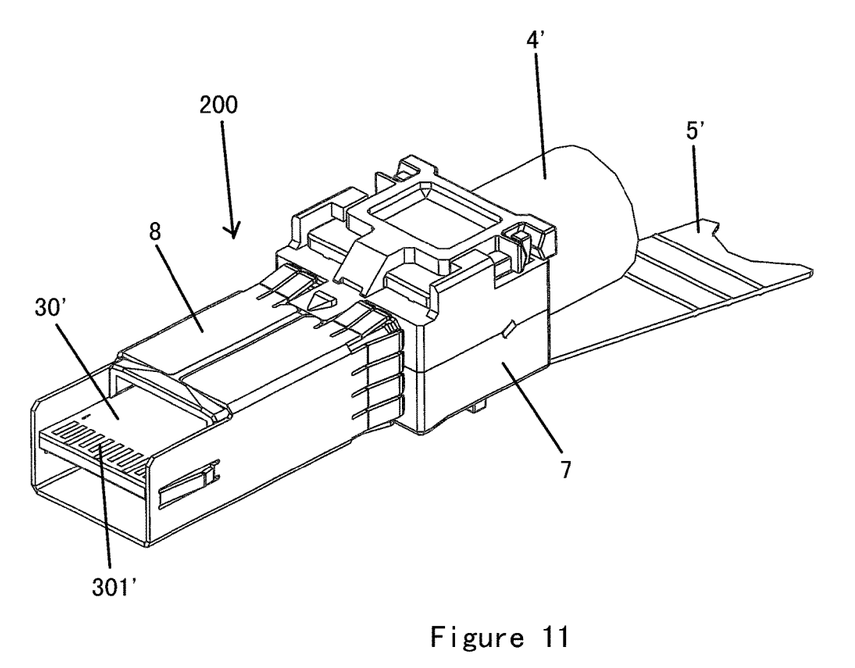
FIG. 11 is a perspective view of another connector according to the invention.

As shown in FIG. 11, the connector 200 includes a housing and an electronic module 30' mounted in the housing. The conductors of a cable are introduced into the housing and each conductor is electrically connected to one end of a contact 301' of the electronic module 30', and the other end of the contact 301' is electrically connected to a respective terminal of the electronic apparatus.

As shown in FIGS. 12-20, in an exemplary embodiment of the invention, the housing includes a first housing 10' and a second housing 20'. The first housing 10' includes a pair of first sidewalls 1' and a slot. The pair of first sidewalls 1' is positioned opposite one another and the slot (see FIGS. 16 and 18) having partitions 11' is formed along a part of each of the first sidewalls 1'. The second housing 20' includes a pair of second sidewalls 2' positioned opposite one another and an extension 21' (see FIGS. 13 and 15) extending in a longitudinal axis of the connector housing, The extension 21' is formed along at least a part of each of the second sidewalls 2' and corresponds to the electronic module 30'.

Figure 19:
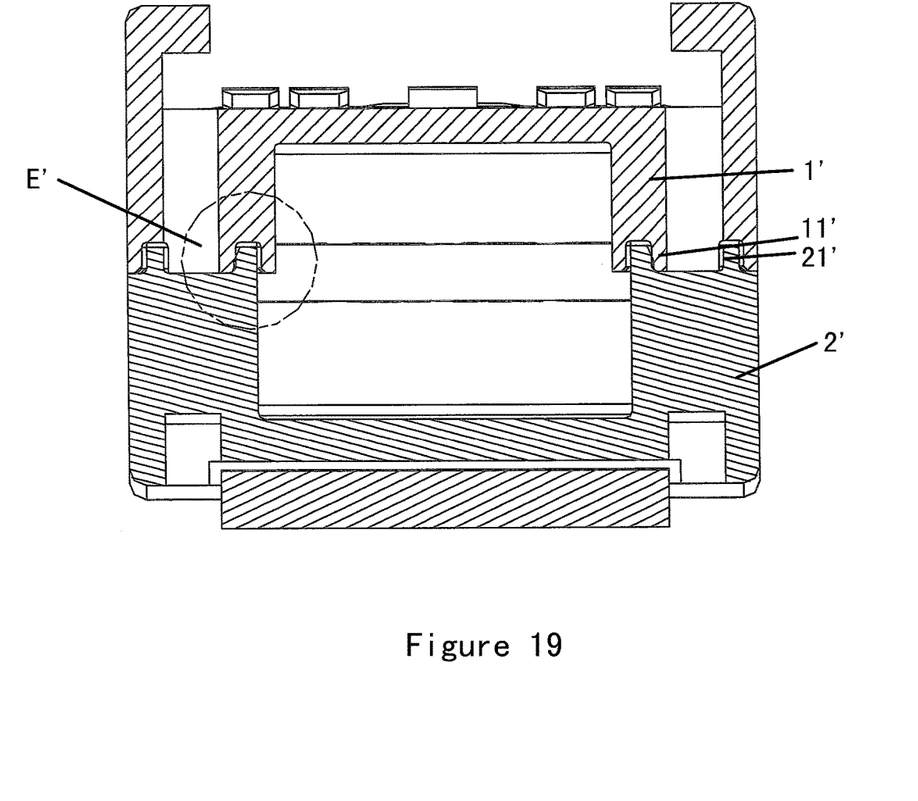
FIG. 19 is an enlarged lateral cross section view of the connector of FIG. 11.
Figure 20:
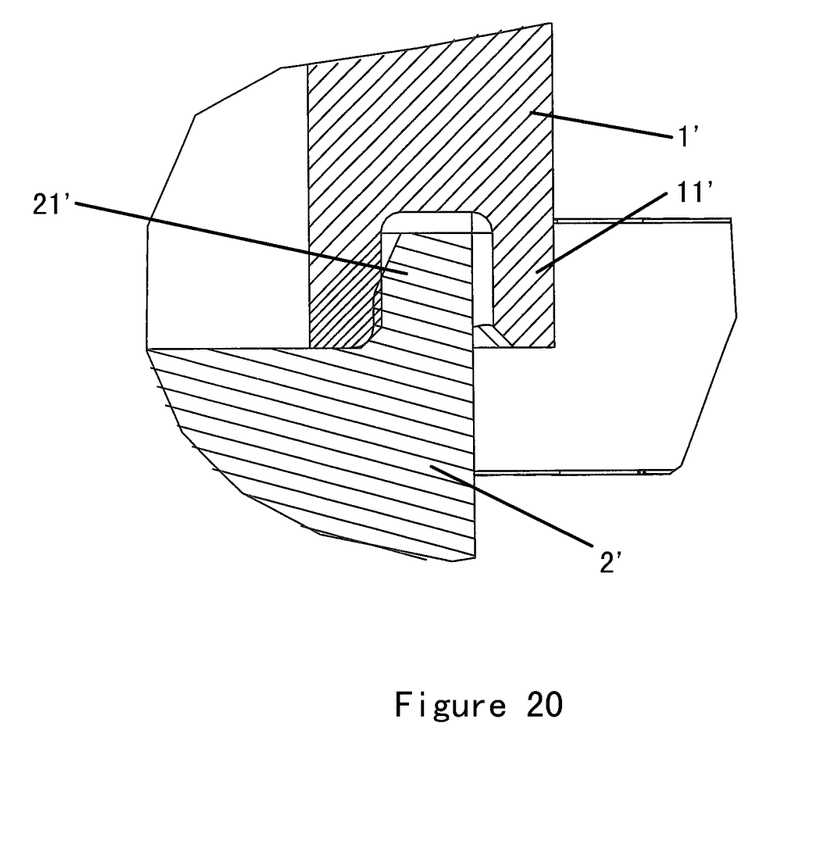
FIG. 20 is an enlarged view of a section E' shown in FIG. 19.

As shown in FIGS. 19-20, the first housing 10' and the second housing 20' are configured so that the extension 21' is fitted in the respective slot and clamped between the partitions 11' of the respective slot after assembling the first housing 10' and the second housing 20' together. In this way, there is no path directly into or out of the connector housing along a radial axis of the electronic module 30', thus, preventing an external electromagnetic signal from entering into the connector housing and disadvantageously interfering the performance of the electronic module inside the connector housing, or preventing an electromagnetic signal generated by the electronic module inside the connector housing from being leaked outside the connector housing and disadvantageously interfering the performance of the other electronic modules outside the connector housing. Thereby, such a design effectively improves the electromagnetic shielding protection to the electronic module mounted in the connector housing.

Figure 13:
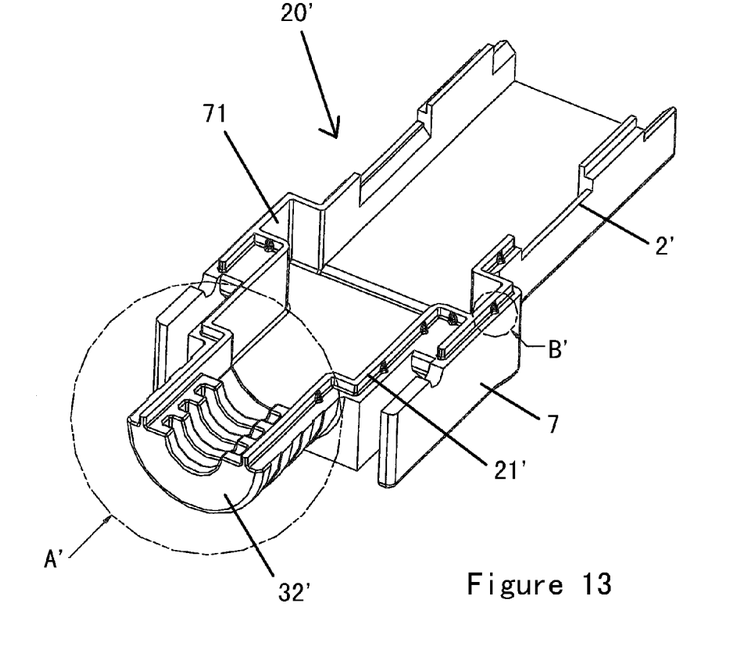
FIG. 13 is a perspective view of a first housing of the connector of FIG. 11.
Figure 14:
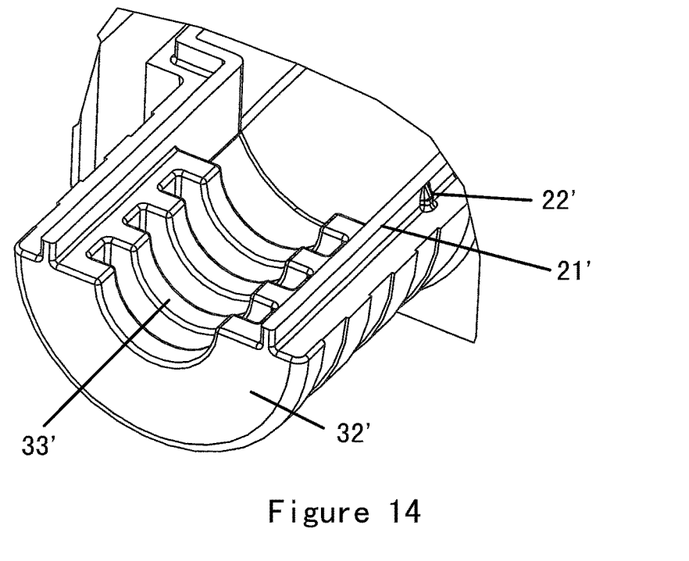
FIG. 14 is an enlarged view of a section A' shown in FIG. 13.
Figure 15:
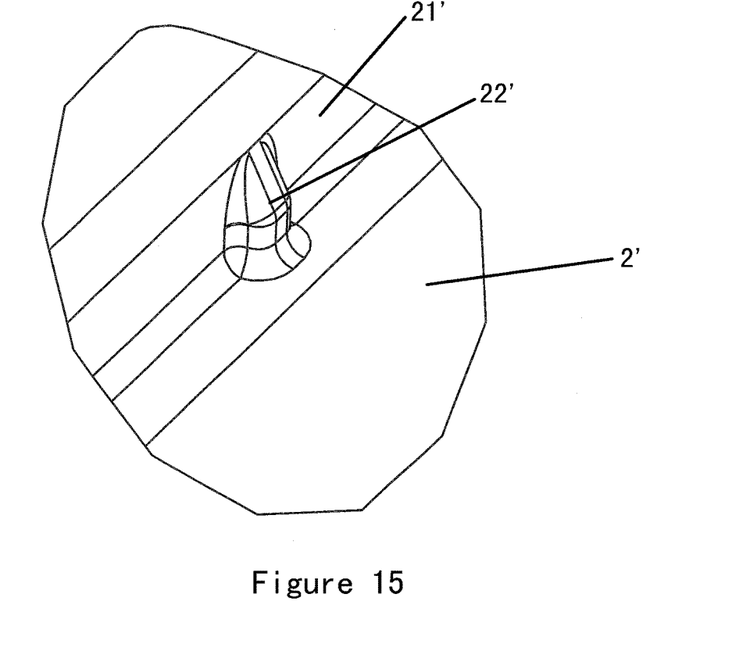
FIG. 15 is an enlarged view of a section B' shown in FIG. 13.
Figure 16:
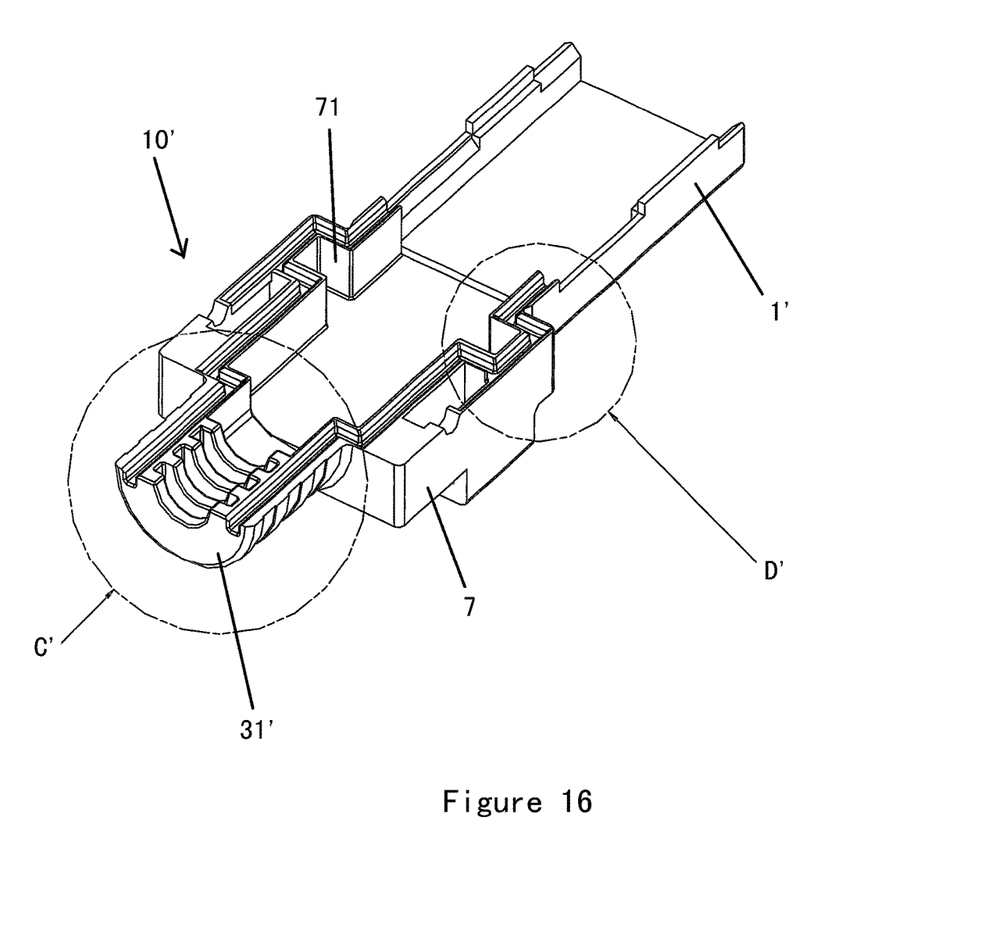
FIG. 16 is a perspective view of a second housing of the connector of FIG. 11.
Figure 17:
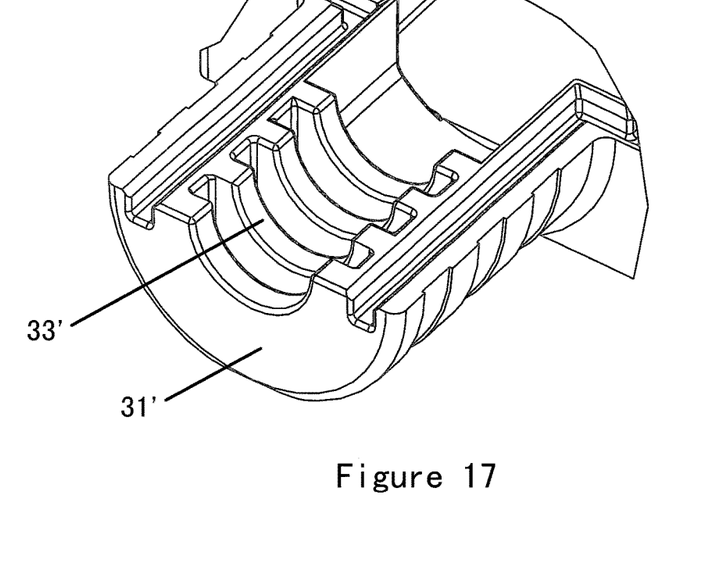
FIG. 17 is an enlarged view of a section C' shown in FIG. 16.
Figure 18:
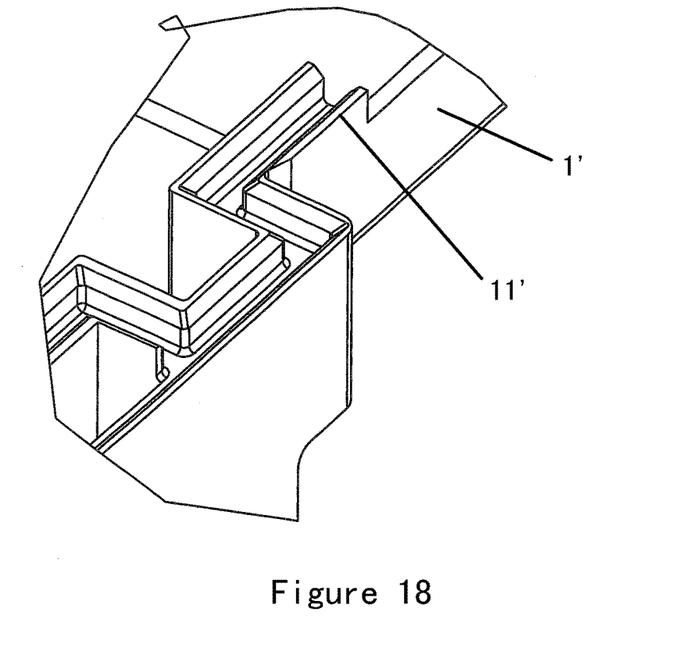
FIG. 18 is an enlarged view of a section D' shown in FIG. 16.

In an exemplary embodiment, as shown in FIGS. 13 and 15, a plurality of ribs 22' are disposed on an outer side of each of the extensions 21', so as to increase a force to clamp the extension 21' with the partitions 11' of the slot. In an exemplary embodiment, when the first housing 10' and the second housing 20' are engaged together, the extension 21' is clamped between the partitions 11' of the respective slot, and the ribs 22' on the extension 21' also are clamped between the partitions 11' of the respective slot. Generally, the total thickness of the extension 21' and the rib 22' is designed to be slightly larger than the gap distance between the partitions 11' of the slot, so that the ribs 22' are fitted in the slot in a way of interference fitting. Thereby, the extension 21' can be reliably held in the slot.

As shown in FIGS. 13-14 and 16-17, the connector housing further includes a pair of cable receiving section 31', 32' integrally formed on first ends of the first and second housings 10', 20', respectively. The pair of cable receiving section 31', 32' are configured to combine a cable receiving passageway 3' to introduce a cable into the connector housing through the cable receiving passageway 3'.

In an exemplary embodiment, a plurality of ring protrusions 33' are formed on an inside wall of each of the cable receiving section 31', 32'. The ring protrusions 33' may be independent from each other or have a form of helical shape. In this way, the cable in the cable receiving passageway 3' may be pressed by the ring protrusions 33', thus, improving the sealing performance, and preventing the electromagnetic signal from passing through the cable receiving passageway 3 and entering into the interior of the housing or being leaked outside the housing along an axial axis of the cable receiving passageway 3'. As shown in FIG. 11, a sleeve 4' is provided on the cable receiving section 31', 32' to engage the cable receiving section 31', 32' together. Thereby, the first housing 10' and the second housing 20' may be held together by the sleeve 4'.

In an exemplary embodiment, the slot extends to the cable receiving section 31', and the extension 21' extends to the cable receiving section 32', so that the entire extension 21' is clamped between the partitions 11' of the respective slot after assembling the first housing 10' and the second housing 20' together.

Figure 12:
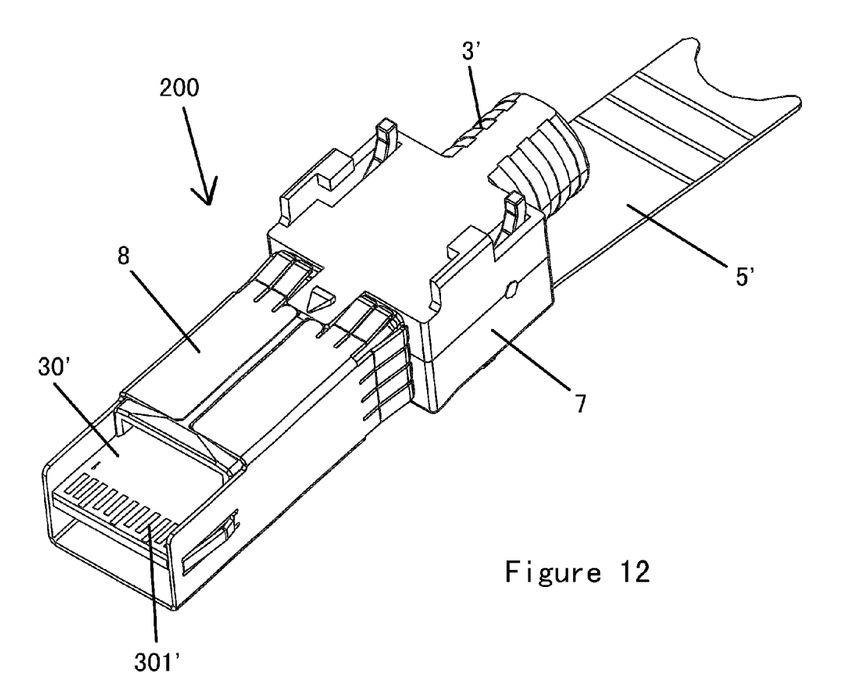
FIG. 12 is a perspective view of the connector of FIG. 11, wherein a sleeve is removed.

As shown in FIGS. 11-12, a grip 5' is provided on the second housing 20'. The grip 5' extends beyond the first end of the second housing 20' in the axial direction. Thereby, if an operation space for the connector is limited in the field, the connector 200 can be simply inserted into or removed from a slot of an electronic apparatus (not shown) by handling the grip 5'.

In an exemplary embodiment, the first housing 10' and the second housing 20' are each provided with an widened section 7. A positioning slot 71 is formed in the widened section 7 and protrudes outward. A positioning portion, adapted to be fitted in the positioning slot 71, is formed on the electronic module 30'. In this way, it can prevent the electronic module from movement in the housing by engaging the positioning slot 71 and the positioning portion of the electronic module.

As shown in FIGS. 11-12, a coupler 8 is provided on a portion of the first and second housings 10', 20' to hold the first and second housings 10', 20' together. Thereby, the first and second housings can be more reliably held together by the coupler 8, and further improve the electromagnetic shielding performance of the housing.

One skilled in the art should appreciate that the cable may be an electrical cable and/or an optical cable. For example, if the electronic module is an optoelectronic module, the cable may include an electrical cable and/or an optical cable.

In the connector housing and connector according to above various embodiments of the invention, the extension 21 is fitted into the respective slot and clamped between the partitions 11 of the respective slot, so there no path directly into or out of the connector housing along a radial direction of the electronic module. Therefore, such a design prevents an external electromagnetic signal from entering into the connector housing and disadvantageously interfering the performance of the electronic module inside the connector housing, or preventing an electromagnetic signal generated by the electronic module inside the connector housing from being leaked outside the connector housing and disadvantageously interfering the performance of the other electronic modules outside the connector housing. In this way, it effectively improves the electromagnetic shielding protection to the electronic module mounted in the connector housing.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:
a housing with an electronic module receiving passageway positioned therein and having:
a first housing with a pair of first sidewalls positioned opposite from each other, a first cable receiving section positioned along a proximal end of the first housing, a pair of partitions forming a slot extending along each of the pair of first sidewalls and along opposite sides of the first cable receiving section, and a first widened section in which the pair of first sidewalls are spaced further apart from each other than in a first section of the first housing; and
a second housing with a pair of second sidewalls positioned opposite one another, a second cable receiving section positioned along a proximal end of the second housing, an extension disposed on each of the pair of second sidewalls and on opposite sides of the second cable receiving section and corresponding with the slot, a plurality of ribs extending outward from the extension and corresponding with an inner surface of the pair of partitions, and a second widened section in which the pair of second sidewalls are spaced further apart from each other than in a second section of the second housing, the first cable receiving section and the second cable receiving section forming a cable receiving passageway at a first end of the housing extending into the electronic module receiving passageway, the electronic module receiving passageway extending through an opposite second end of the housing.

2. The connector according to claim 1, wherein the slot receives the extension such that the pair of partitions engage the extension.

3. The connector according to claim 2, wherein the plurality of ribs are formed along an inner side and an outer side of the extension and inner side of the pair of partitions.

4. The connector according to claim 3, further comprising a plurality of ring protrusions disposed along an inner wall of the cable receiving passageway.

5. The connector according to claim 4, wherein the plurality of ring protrusions abut a cable positioned in the cable receiving passageway.

6. The connector according to claim 3, further comprising a sleeve positioned over the first and second cable receiving sections.

7. The connector according to claim 1, further comprising a grip extending from the first housing or the second housing.

8. The connector according to claim 1, wherein the connector is substantially cuboid shaped.

9. The connector according to claim 8, further comprising a block on an inner side of the first housing or the second housing.

10. The connector according to claim 1, further comprising a coupler overlapping and biasing the first and second housings toward each other.

11. The connector according to claim 10, wherein the coupler extends around a perimeter of the first housing and the second housing.

12. The connector according to claim 1, further comprising an electronic module disposed in the electronic module receiving passageway and exposed at the second end of the housing.

13. The connector according to claim 12, wherein the first widened section and the second widened section each form a positioning slot.

14. The connector according to claim 13, wherein a positioning portion of the electronic module is disposed in each positioning slot.

15. The connector according to claim 14, wherein the pair of first sidewalls are spaced further apart from each other in the positioning slot of the first widened section than in the first widened section.

16. The connector according to claim 15, wherein the pair of second sidewalls are spaced further apart from each other in the positioning slot of the second widened section than in the second widened section.

17. The connector according to claim 1, wherein the second widened section corresponds to the first widened section.

* * * * *